(12) United States Patent
Cho et al.

(10) Patent No.: US 12,491,917 B2
(45) Date of Patent: Dec. 9, 2025

(54) INTEGRATED OPERATION APPARATUS FOR AUTONOMOUS DRIVING VEHICLE

(71) Applicants: Hyundai Motor Company, Seoul (KR); Kia Corporation, Seoul (KR); SL Corporation, Daegu (KR)

(72) Inventors: Jae Wan Cho, Seoul (KR); Won Jin Jeong, Hwaseong-si (KR); Chun Nyung Heo, Gyeongsan-si (KR); Gwang Sun Kim, Gyeongsan-si (KR); Yong Woo Park, Gyeongsan-si (KR); Jae Hoon Jung, Gyeongsan-si (KR); Seok Woo Ye, Daegu (KR); Mi Rae Do, Gyeongsan-si (KR)

(73) Assignees: HYUNDAI MOTOR COMPANY, Seoul (KR); KIA CORPORATION, Seoul (KR); SL CORPORATION, Daegu (KR)

( * ) Notice: Subject to any disclaimer, the term of this patent is extended or adjusted under 35 U.S.C. 154(b) by 151 days.

(21) Appl. No.: 18/387,140

(22) Filed: Nov. 6, 2023

(65) Prior Publication Data
US 2024/0367690 A1    Nov. 7, 2024

(30) Foreign Application Priority Data
May 3, 2023   (KR) .................. 10-2023-0057750

(51) Int. Cl.
*B60W 60/00*    (2020.01)
*B62D 15/02*    (2006.01)

(52) U.S. Cl.
CPC ....... *B60W 60/0054* (2020.02); *B62D 15/025* (2013.01)

(58) Field of Classification Search
USPC ...................................... 701/23–28
See application file for complete search history.

(56) References Cited

U.S. PATENT DOCUMENTS

| | | | |
|---|---|---|---|
| 8,374,743 B2* | 2/2013 | Salinger | G05D 1/0246 701/28 |
| 10,520,973 B2* | 12/2019 | Parazynski | G05G 9/04788 |
| 2004/0204811 A1* | 10/2004 | Huang | G05G 5/03 701/50 |
| 2005/0057031 A1* | 3/2005 | Ahnafield | B60T 7/10 280/771 |

(Continued)

FOREIGN PATENT DOCUMENTS

| JP | 4410605 B2 | 2/2010 |
|---|---|---|
| JP | 6590285 B2 | 10/2019 |

(Continued)

*Primary Examiner* — Jonathan L Sample
(74) *Attorney, Agent, or Firm* — Morgan, Lewis & Bockius LLP

(57) ABSTRACT

An integrated operation apparatus for an autonomous vehicle, includes a joystick lever used to accelerate, decelerate, and steer the vehicle, an acceleration and deceleration actuator module and a steering actuator module each include a position sensor module to generate signals related to the acceleration, deceleration, and steering of the vehicle when the joystick lever module is operated, and a torque sensor module is used to feedback control a steering motor during steering operation, realizing more precise steering sensation.

19 Claims, 17 Drawing Sheets

(56) References Cited

U.S. PATENT DOCUMENTS

| | | | | |
|---|---|---|---|---|
| 2007/0208483 | A1* | 9/2007 | Rabin | G05D 1/0891 |
| | | | | 701/72 |
| 2016/0091083 | A1* | 3/2016 | Drees | F16H 59/0204 |
| | | | | 74/473.18 |
| 2017/0274921 | A1* | 9/2017 | Clause | G05G 9/047 |
| 2017/0336785 | A1* | 11/2017 | Young | B60T 1/16 |
| 2018/0265028 | A1* | 9/2018 | Mori | B60N 2/797 |
| 2020/0207399 | A1* | 7/2020 | De Simone | B62D 1/12 |
| 2020/0324773 | A1* | 10/2020 | Kim | B60K 20/02 |
| 2021/0213829 | A1* | 7/2021 | Choi | B62D 1/12 |
| 2021/0221422 | A1* | 7/2021 | Choi | B60K 26/02 |
| 2022/0305908 | A1* | 9/2022 | Jeong | B60T 7/102 |
| 2023/0288922 | A1* | 9/2023 | Kim | G05D 1/0016 |

FOREIGN PATENT DOCUMENTS

| | | |
|---|---|---|
| KR | 10-0709772 B1 | 4/2007 |
| KR | 10-1166895 B1 | 7/2012 |

\* cited by examiner

INTEGRATED OPERATION APPARATUS FOR AUTONOMOUS DRIVING VEHICLE

CROSS REFERENCE TO RELATED APPLICATION

The present application claims priority to Korean Patent Application No. 10-2023-0057750, filed May 3, 2023, the entire contents of which is incorporated herein for all purposes by this reference.

BACKGROUND OF THE PRESENT DISCLOSURE

Field of the Present Disclosure

The present disclosure relates to an integrated operation apparatus for a vehicle, and more particularly, to an integrated operation apparatus for an autonomous vehicle configured to accelerate, decelerate, and steer the vehicle using a joystick lever.

Description of Related Art

An autonomous vehicle is a smart vehicle employing autonomous driving technology that enables the vehicle to reach the destination on its own without a driver directly manipulating the steering wheel, accelerator pedal, or brake pedal.

When autonomous driving is universally realized, a driver may select a manual driving mode with the driver directly involved in driving or an autonomous driving mode with the vehicle driving to the destination on its own without the driver directly involved in driving.

When an emergency occurs during autonomous driving, someone among the passengers of the vehicle needs to manually drive the vehicle, and to the present end, the vehicle needs to be equipped with a user-operated device for manual driving mode.

For example, a vehicle manager drives a vehicle in manual driving mode using a device like a joystick used in a game console or the like in some cases.

A device operated by a user to drive a vehicle in manual driving mode may include a plurality of switches manipulated for accelerating, braking, steering, gear shifting, and the like of the vehicle. Since such a device is equipped with a plurality of switches for different functions, the device may be named an integrated operation apparatus.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an integrated operation apparatus for an vehicle configured to accelerate, decelerate, and steer the vehicle using a joystick lever, improving marketability through easy operation and user satisfaction.

According to an exemplary embodiment of the present disclosure, an integrated operation apparatus may include a joystick lever module coupled to an acceleration and deceleration actuator housing coupled to the main body rotatably in right and left directions and activated in response to a user's operation to accelerate, decelerate, and steer the vehicle, an acceleration and deceleration actuator module coupled to the acceleration and deceleration actuator housing and connected to the joystick lever module for power transmission to generate a reaction force in the joystick lever module rotated for accelerating or decelerating during operation thereof and return the joystick lever module to the neutral position with the generated reaction force, a first position sensor module provided in the joystick lever module and the acceleration and deceleration actuator housing to detect acceleration and deceleration positions of the joystick lever module, a steering actuator module coupled to the main body and connected to the acceleration and deceleration actuator housing to generate a reaction force in the joystick lever module rotated for steering during operation thereof and return the joystick lever module to a neutral position with the generated reaction force, a second position sensor module provided in the main body and the steering actuator module to detect the steering position of the joystick lever module, and a control module generating the vehicle's acceleration, deceleration, and steering signals according to a signal received from the first and second position sensor modules and controlling the acceleration and deceleration actuator module and the steering actuator module.

The joystick lever module may rotate forward or backward for acceleration or deceleration operation, and the acceleration and deceleration actuator housing may remain fixed to the main body while only the joystick lever module is rotated with respect to the acceleration and deceleration actuator housing during the acceleration or deceleration operation of the joystick lever module.

The joystick lever module may be rotated right and left to operate steering, and the acceleration and deceleration actuator module, the acceleration and deceleration actuator housing, and a portion of the steering actuator module may rotate with respect to the main body during steering operation of the joystick lever module.

The joystick lever module may include a joystick lever grasped by the user and a lever body provided with a rod connected to the joystick lever and connected to the acceleration and deceleration actuator module.

The acceleration and deceleration actuator module may include an acceleration and deceleration motor fixed to the acceleration and deceleration actuator housing, a first drive pulley coupled to the acceleration and deceleration motor to rotate together, a first driven pulley integrally coupled to the lever body forming a lower portion of the joystick lever module, and a first wire connecting the first drive pulley and first driven pulley to transmit power.

The first position sensor module may include a first permanent magnet fixedly coupled to the lever body forming the lower portion of the joystick lever module, and a first printed circuit board (PCB) fixed to the acceleration and deceleration actuator housing and provided with a first Hall sensor facing the first permanent magnet to detect acceleration and deceleration positions of the joystick lever module through a magnetic flux change caused by a position change of the first permanent magnet when the lever body rotates.

The control module may include a main PCB and a motor controller fixed to the main body, the main PCB and the motor controller are configured to transmit and receive signals therebetween, and the motor controller is configured to control the driving of the acceleration and deceleration motor according to the signal received from the second PCB.

The steering actuator module may include a steering motor fixed to the main body, a second drive pulley coupled to the steering motor to rotate together, a second driven pulley connected to the acceleration and deceleration actuator housing to rotate together, and a second tire connecting the second drive pulley and the second driven pulley to transmit power from the second drive pulley to the second driven pulley.

A body stopper portion provided in the main body and a pulley stopper portion provided in the second driven pulley may be further included, and the maximum steering angle is restrained when the pulley stopper portion comes into contact with the body stopper portion during the rotation of the second driven pulley according to the steering operation.

The pulley stopper portion may be symmetrically provided right and left with respect to a rotation center portion of the second driven pulley, and the body stopper portion may be provided at a distance below the pulley stopper portion to match the pulley stopper portion.

The above second position sensor module may include a second permanent magnet fixed to the main body and a second PCB coupled to the second driven pulley and provided with a second Hall sensor facing the second permanent magnet to detect a steering position of the joystick lever module through a magnetic flux change of the second permanent magnet when the acceleration and deceleration actuator housing and the second driven pulley are rotated according to steering operation.

The control module may include the main PCB and the motor controller fixed to the main body, the main PCB and the motor controller are configured to transmit and receive signals therebetween, and the motor controller is configured to control the driving of the steering motor according to the signals received from the second PCB.

A torque sensor module provided in the acceleration and deceleration actuator housing and the second driven pulley to detect a magnetic field change generated by a rotational difference between the acceleration and deceleration actuator housing and the second driven pulley during steering operation and utilized to feedback control the driving of the steering motor by a difference value between the actual steering operation force and target steering operation force based on the detected magnetic field change may be further included.

The torque sensor module may include a torsion bar connecting the acceleration and deceleration actuator housing and the second driven pulley and twisted by the rotational difference between the acceleration and deceleration actuator housing and the second driven pulley according to the steering operation, a housing bracket coupled to the acceleration and deceleration actuator housing from outside of the torsion bar to rotate together with the acceleration and deceleration actuator housing, a third permanent magnet coupled to the housing bracket, and a third PCB coupled to the second driven pulley and provided with a third Hall sensor facing the third permanent magnet to detect a magnetic field change generated by the rotational difference between acceleration and deceleration actuator housing and the second driven pulley during steering operation.

The control module may include the main PCB and the motor controller fixed to the main body, the main PCB and the motor controller are configured to transmit and receive signals therebetween, the third PCB detects a magnetic field change generated by the rotational difference between the acceleration and deceleration actuator housing and the second driven pulley during steering operation and transmits the detected magnetic field change to the main PCB, the main PCB obtains the difference between the actual steering operation force and the target steering operation force after converting the magnetic field change into a torque value and then transmits a signal to the motor controller, and the motor controller feedback is configured to control the driving of the steering motor by the difference value at the signals received from the main PCB.

The power of the acceleration and deceleration motor may be transmitted to the joystick lever module through the first drive pulley, the first wire, and the first driven pulley so that the joystick lever module shifts to a pop-up position or a folding position.

The first position sensor module may further include the function of detecting folding and pop-up positions of the joystick lever module.

The joystick lever module may be restrained by a solenoid in the pop-up position or folding position.

A first anti-slip pin may be provided on the line of the first wire and fixed to the external perimeter of the first drive pulley, and first adjust bolts are provided at end portions of the first wire and fixedly coupled to the first driven pulley.

A second anti-slip pin may be provided on the line of the second wire and fixed to the external perimeter of the second drive pulley, and second adjust bolts are provided at end portions of the second wire and fixedly coupled to the second driven pulley.

In the integrated operation apparatus for the vehicle according to an exemplary embodiment of the present disclosure, a joystick lever may be used to accelerate, decelerate, and steer the vehicle, including an effect of improving marketability through easy operation and user satisfaction.

Furthermore, in the integrated operation apparatus according to an exemplary embodiment of the present disclosure, the acceleration and deceleration actuator module and steering actuator module respectively may include a position sensor module to detect the position of the joystick lever module during acceleration operation or deceleration operation and steering operation and transmit signals related to the acceleration or deceleration and steering of the vehicle to vehicle controllers, and in the case of the acceleration and deceleration actuator module, there may be the advantage that the acceleration and deceleration motor generates torque so that the driver can feel a proper operation force according to the position of the joystick lever module.

Furthermore, a torque sensor module may be additionally provided in the steering actuator module to directly measure the operation force felt by the driver during steering operation using the joystick lever module, the difference from the target steering operation force based on the driving state of the vehicle is obtained, and the steering motor may be feedback-controlled based on the obtained difference value, including an effect of realizing more precise steering sensation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
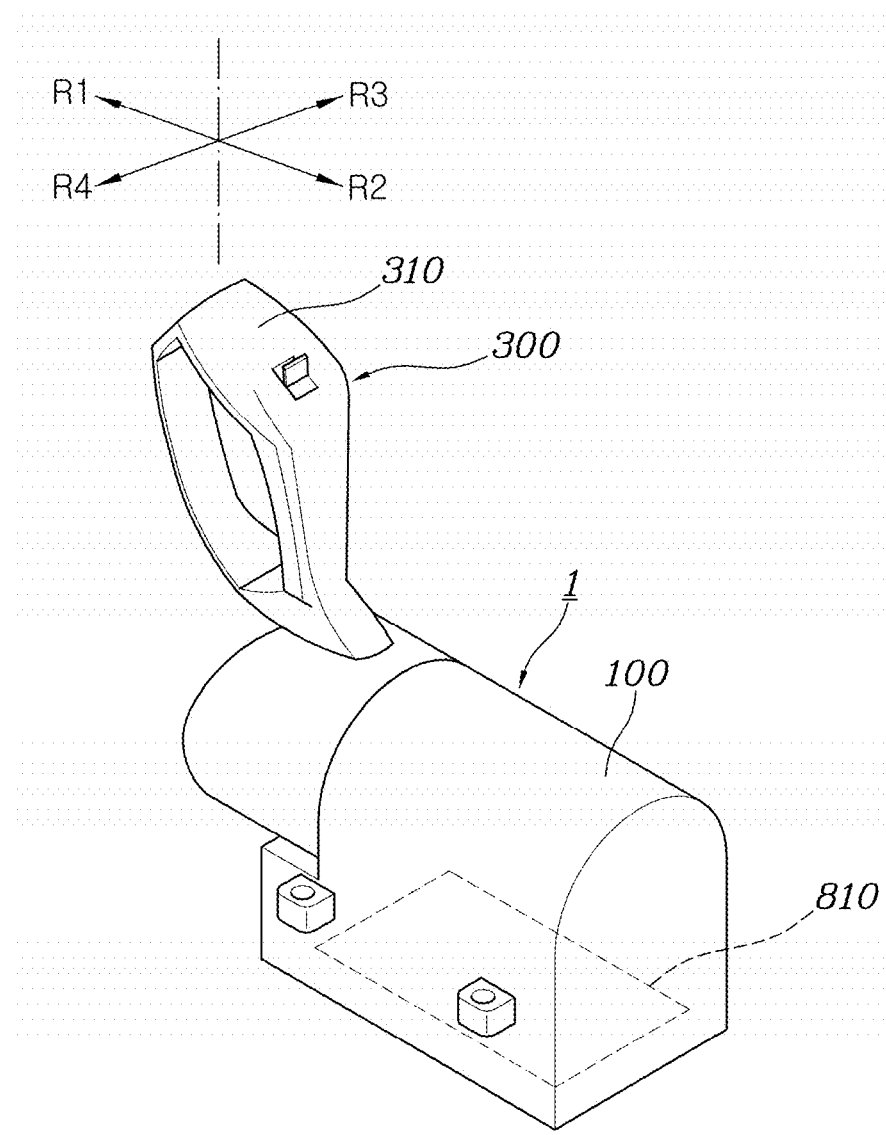
FIG. 1 is a view showing a joystick lever in a pop-up state in an integrated operation apparatus according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below: While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The exemplary embodiments included herein will be described in detail with reference to the accompanying drawings. However, the same or similar components will be provided the same reference numerals regardless of the drawing numbers, and the repetitive descriptions regarding these components will be omitted.

The suffixes "module" and "unit" for the components used in the following description are provided or interchangeably used only to facilitate the writing of the specification, without necessarily indicating a distinct meaning or role of their own.

When it is determined that the specific description of the related and already known technology may obscure the essence of the exemplary embodiments included herein, the specific description will be omitted.

Furthermore, it is to be understood that the accompanying drawings are only intended to facilitate understanding of the exemplary embodiments included herein and are not intended to limit the technical ideas included herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for distinguishing one component from another.

It is to be understood that when a component is referred to as being "connected" or "coupled" to another component, the component may be directly connected or coupled to the another component, but other components may be interposed therebetween.

In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

Furthermore, a unit or a control unit included in the names such as a motor control unit (MCU), a hybrid control unit (HCU), and the like is a term widely used in the naming of controllers that control specific functions of a vehicle and does not mean a generic function unit.

A controller may include a communication device that communicates with other controllers or sensors to control functions it is charged with, a memory for storing an operating system, logic commands, input and output information, and the like, and one or more processors performing functions such as decision-making, calculation, determination, and the like required for controlling the functions with which it is charged.

An integrated operation apparatus for a vehicle according to exemplary embodiments of the present disclosure will be described with reference to the accompanying drawings below.

An autonomous vehicle is provided with an integrated operation apparatus that a user (manager) can directly operate to drive the vehicle in manual driving mode.

The user may operate the integrated operation apparatus with one hand or both hands.

According to an exemplary embodiment of the present disclosure, as shown in FIGS. 1 to 16, an integrated operation apparatus 1 includes a main body 100 forming an external body, an acceleration and deceleration actuator housing 200 coupled to one side of the main body 100, a joystick lever module 300 coupled to the acceleration and deceleration actuator housing 200 and activated in response to a user's operation to accelerate, decelerate, and steer the vehicle, an acceleration and deceleration actuator module 400 coupled to the acceleration and deceleration actuator housing 200 and connected to the joystick lever module 300 for power transmission to generate a reaction force in the joystick lever module 300 rotated for acceleration or deceleration during operation thereof and return the joystick lever module 300 to a neutral position with the generated reaction force, a first position sensor module 500 provided in the joystick lever module 300 and the acceleration and deceleration actuator housing 200 to detect the acceleration and deceleration positions of the joystick lever module 300, a steering actuator module 600 coupled to the main body 100 and connected to the acceleration and deceleration actuator housing 200 to generation a reaction force in the joystick lever module 300 rotated for steering during operation thereof and return the joystick lever module 300 to the neutral position with the generated reaction force, a second position sensor module 700 provided in the main body 100 and the steering actuator module 600 to detect the steering position of the joystick lever module 300, and a control module 800 generating the vehicle's acceleration, deceleration, and steering signals at the signal of the first and second position sensor modules 500, 700 and controlling the driving of the acceleration and deceleration actuator module 400 and the steering actuator module 600.

When the integrated operation apparatus 1 is provided in an autonomous vehicle, the main body 100 may be fixedly provided at a designated position inside the vehicle where the main body 100 cannot move or may be moved to a position that the user desires as needed.

The joystick lever module 300 includes a joystick lever 310 and a lever body 330 connected to the joystick lever 310 via a rod 320 and connected to the acceleration and deceleration actuator module 400.

The user may operate the joystick lever module 300 by rotating the entire joystick lever module forward, backward, right, and left after grasping the joystick lever 310 with a hand.

According to an exemplary embodiment of the present disclosure, the vehicle is accelerated or decelerated when the joystick lever 310 rotates back and forth and steered when the joystick lever 310 rotates right and left.

According to an exemplary embodiment of the present disclosure, the acceleration and deceleration actuator housing 200 remains fixed to the main body 100 and only the joystick lever module 300 rotates right and left with respect to the acceleration and deceleration actuator housing 200 during acceleration operation or deceleration operation of the joystick lever module 300.

The acceleration and deceleration actuator module 400, the acceleration and deceleration actuator housing 200, and a portion of the steering actuator module 600 are rotated right and left with respect to the main body 100 during steering operation of the joystick lever module 300.

A main printed circuit board (PCB) 810 provided in the main body 100 generates a signal related to the acceleration of the vehicle when the user rotates the joystick lever 310 forward (R1 direction in FIG. 1) while grasping the joystick lever 310 with a hand and generates a signal related to the deceleration of the vehicle when the joystick lever 310 is rotated backward (R2 direction in FIG. 1).

Conversely, the joystick lever 310 may be configured so that a forward rotation decelerates the vehicle while a backward rotation accelerates the vehicle.

Furthermore, when the user rotates the joystick lever 310 right or left (R3, R4 directions in FIG. 1), the main PCB 810 generates a signal related to the steering of the vehicle.

On the other hand, the configuration may be so that rotating the joystick lever 310 forward accelerates the vehicle while returning the forward-rotated joystick lever 310 to the neutral position decelerates the vehicle. The present configuration may be equivalent to the concept of one-pedal where both acceleration and deceleration are executed with a single pedal.

Furthermore, in the one-pedal mode concept of the joystick lever 310, a forward operation of the joystick lever 310 may execute forward acceleration while a backward operation may execute backward acceleration.

The joystick lever 310 remains in the middle without rotating forward or backward unless the user's operation force is applied to the joystick lever 310, and the position of the joystick lever 310 at the instant time may be defined as the neutral position.

Accordingly, if the user operates the steering by rotating the joystick lever 310 right or left and then the operating force is lifted while the steering operation is still in place, the joystick lever 310 returns to the pre-rotation neutral position.

When returning to the neutral position executes the deceleration, the number of operations of the joystick lever 310 for deceleration may be reduced, including the advantage of greatly reducing the driver's fatigue, and facilitating the operation of the joystick lever 310 by eliminating the need to brake immediately before cornering after driving at high speed.

When the vehicle accelerates or decelerates by operation of the joystick lever 310, the range of speed change of the vehicle expands widely, allowing for sudden acceleration or abrupt braking. The vehicle speed may change in the increment of 5 km/h or 10 km/h, for example.

When the vehicle accelerates or decelerates (brakes) by the manipulation of the joystick lever 310, there is no upper limit to the speed to allow for sudden acceleration and abrupt braking. Accordingly, maximum acceleration performance or braking performance may be achieved, and the vehicle may accelerate or decelerate with 100% of the vehicle's maximum output.

When the joystick lever 310 is manipulated, the first position sensor module 500 detects the manipulation of the joystick lever 310 and transmits a manipulation signal to the main PCB 810 through the motor controller 820, and the control signal of the main PCB 810 is transmitted to a vehicle controller 910, and the vehicle controller 910 transmits the control signal to the driving system, braking system, and steering system of the vehicle so that one or more of acceleration, braking, and steering of the vehicle may be executed.

According to an exemplary embodiment of the present disclosure, the acceleration and deceleration actuator module 400 includes an acceleration and deceleration motor 410 fixed to the acceleration and deceleration actuator housing 200 coupled to the main body 100, a first drive pulley 420 coupled to the acceleration and deceleration motor 410 to rotate together, a first driven pulley 430 integrally coupled to the lever body 330 of the joystick lever module 300, and a first wire 440 connecting the first drive pulley 420 and the first driven pulley 430 to transmit power.

The acceleration and deceleration actuator housing 200 is coupled to one side of the main body 100.

The acceleration and deceleration actuator housing 200 remains fixed to the main boy 100 without moving during acceleration operation or deceleration operation of the joystick lever 310 and rotates with respect to the main body 100 in the same direction as the rotation direction of the joystick lever 310 during steering operation of the joystick lever 310.

In the acceleration and deceleration actuator housing 200, the housing body 210 is coupled to the main body 100, the housing bracket 220 and the housing cover 230 are sequentially coupled to the housing body 210, and the housing bracket 220 is covered with the housing cover 230.

An acceleration and deceleration motor 410 is fixed to the housing body 210, and the lever body 330 of the joystick lever module 300 is provided in the housing bracket 220.

A rod 320 of the joystick lever module 300 passes through the housing cover 230 to be coupled to the joystick lever 310.

The first wire 440 of the acceleration and deceleration actuator module 400 is connected to the first drive pulley 420 and the first driven pulley 430 for power transmission.

A first anti-slip pin 450 is provided on the line of the first wire 440 to prevent interference between the first driving pulley 420 and the first wire 440 and fixed to the external perimeter of the first drive pulley 420.

Furthermore, the first adjust bolt 460s are provided at either end portion of the first wire 440 and the first adjust bolt 460 is fixedly coupled to the first driven pulley 430. As the tension may be adjusted through the first adjust bolt 460, the first wire 440 may always maintain the constant tension.

According to an exemplary embodiment of the present disclosure, a first position sensor module 500 includes a first permanent magnet 510 fixedly coupled to the lever body 330 forming the joystick lever module 300, a first Hall sensor 520 fixed to the housing bracket 220 to face the first permanent magnet 510, and a first PCB 530 detecting the folding and pop-up positions of the joystick lever module 300 and the acceleration and deceleration positions of the joystick lever module 300 through a magnetic flux change caused by a position change of the first permanent magnet 510 during rotation of the lever body 330.

The first permanent magnet 510 is fixed to one side of the lever body 330, the first PCB 530 is fixed to the housing bracket 220, and the first Hall sensor 520 provided in the first PCB 530 is provided to face the first permanent magnet 510.

The first position sensor module 500 not only detects the folding and pop-up positions of the joystick lever module 300 but also detects positions through magnetic flux changes during forward and backward rotations by the user's operation of the joystick lever module 300 so that an acceleration signal or deceleration signal may be generated by the control of the main PCB 810.

According to an exemplary embodiment of the present disclosure, the control module 800 includes the main PCB 810 and the motor controller 820 fixed to the main body 100, and the main PCB 810 and the motor controller 820 may transmit and receive signals therebetween.

The driver may select the autonomous driving mode or manual driving mode of the vehicle by manipulating the driving mode switching unit 10 in the autonomous vehicle.

The driving mode switching unit 10 may include a switch, a button, or a dial that generates an autonomous drive mode signal or a manual driving mode signal.

The driving mode switching unit 10 may be provided around the driver's seat for easy operation by the driver and may be positioned in the seat as needed in the autonomous vehicle.

Figure 2:
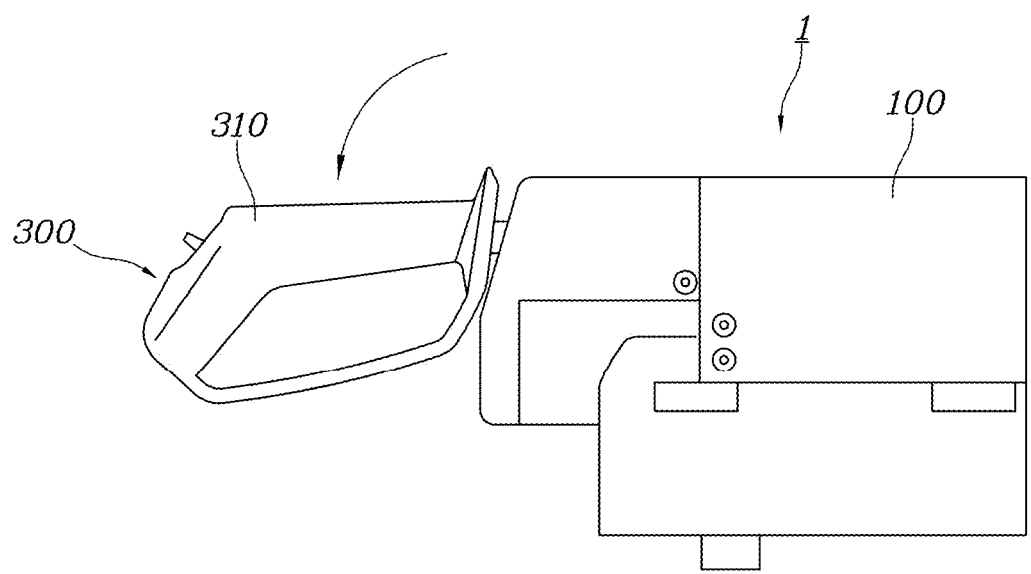
FIG. 2 is a view showing a joystick lever in a folding state.
Figure 3:
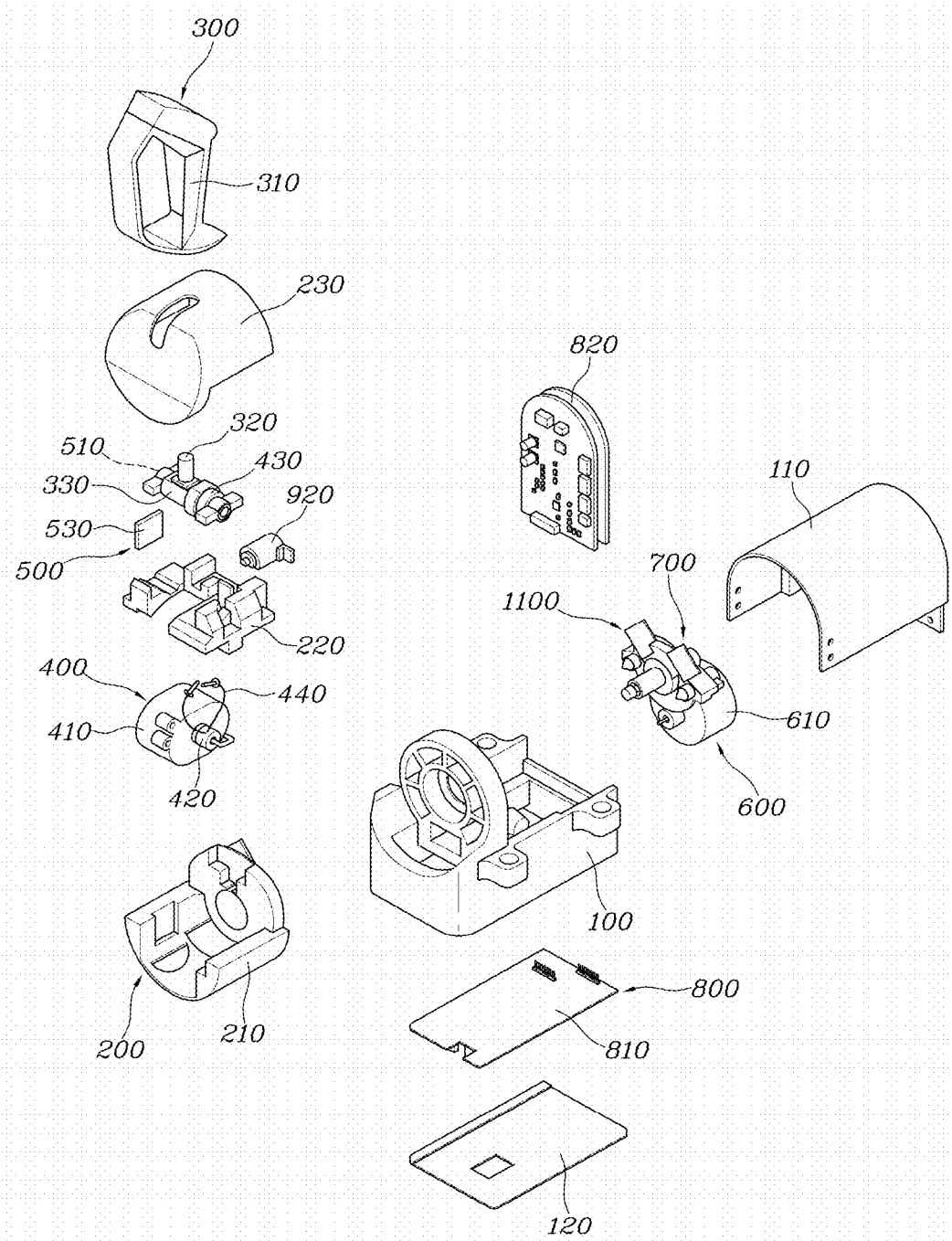
FIG. 3 is an exploded view of an integrated operation apparatus according to an exemplary embodiment of the present disclosure.
Figure 4:
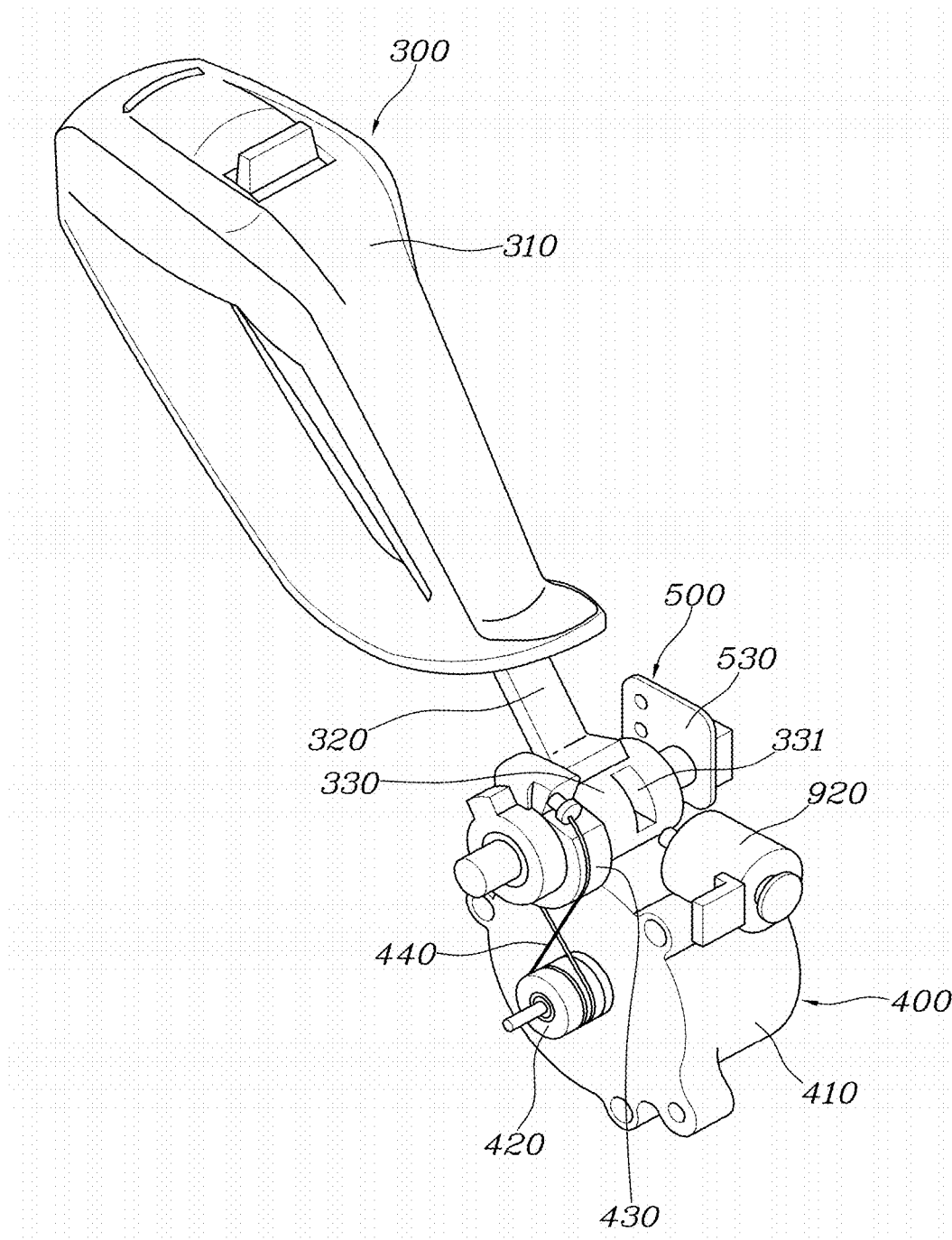
FIG. 4 and FIG. 5 are views showing an acceleration and deceleration actuator module in a coupled state according to an exemplary embodiment of the present disclosure.
Figure 5:
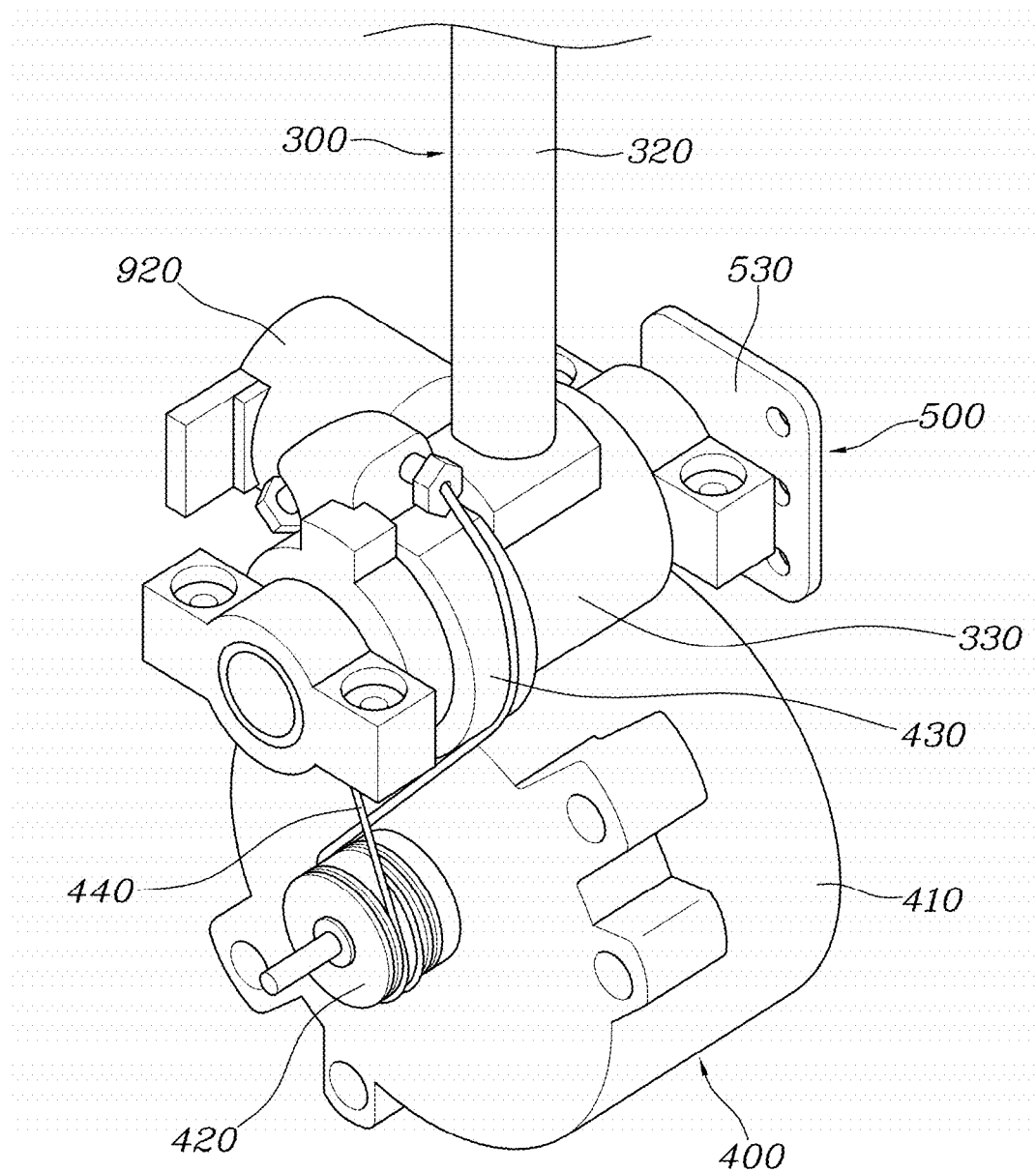
Figure 6:
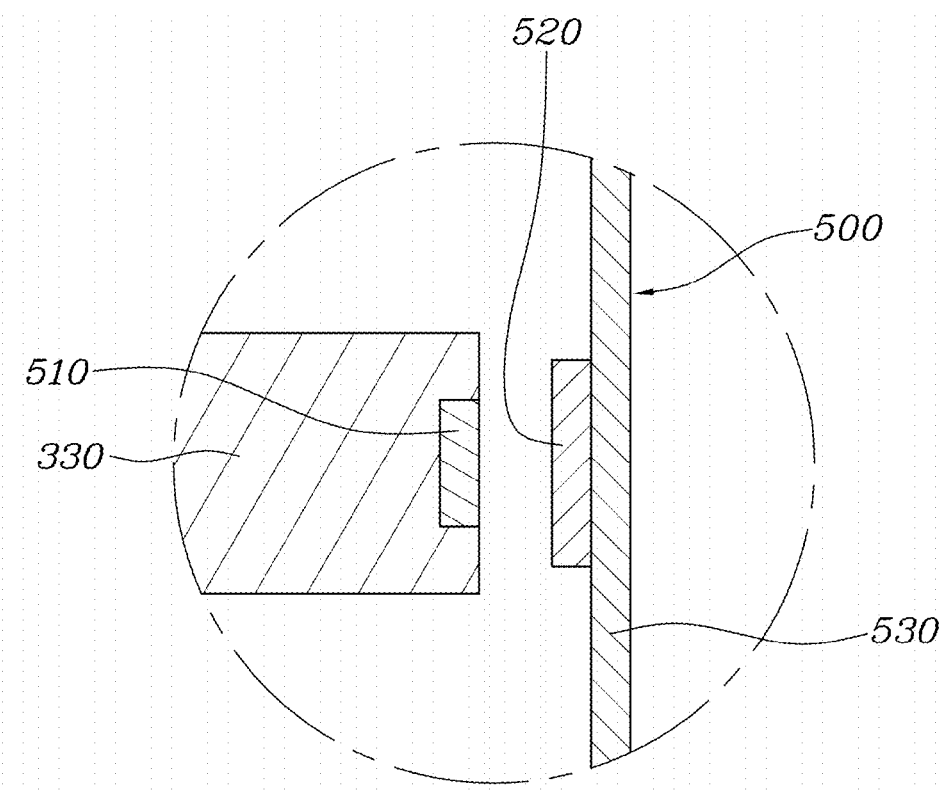
FIG. 6 is a view showing a first position sensor module according to an exemplary embodiment of the present disclosure.
Figure 16:
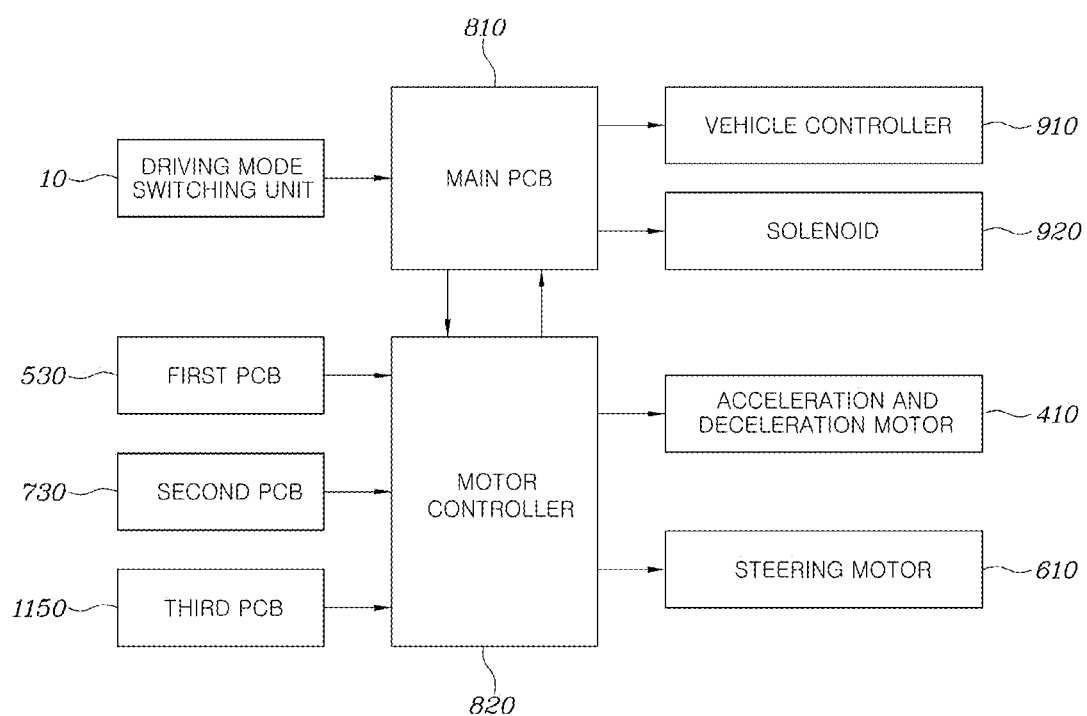
FIG. 16 is a block diagram schematically showing a signal circuit of an integrated operation apparatus according to an exemplary embodiment of the present disclosure.
Figure 17:
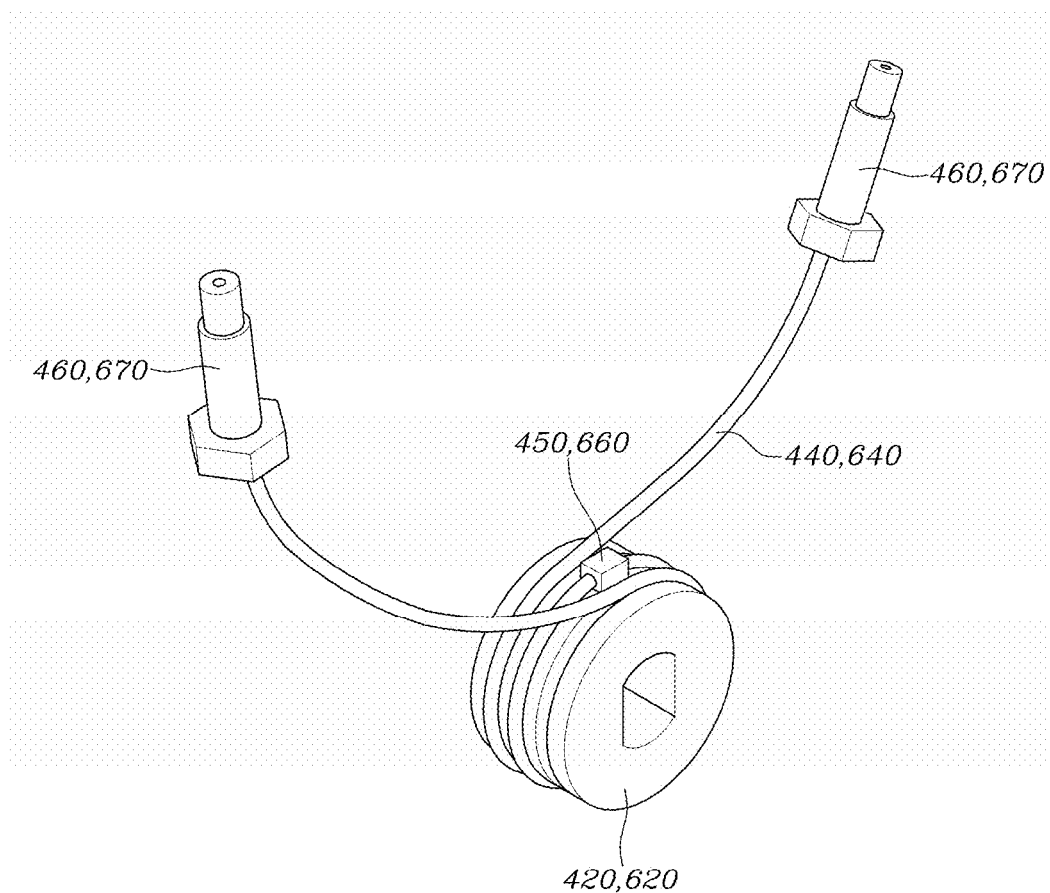
FIG. 17 is a view showing first and second slip pins and first and second adjust bolts according to an exemplary embodiment of the present disclosure.

As shown in FIG. 16, signals of the driving mode switching unit 10 may be transmitted to the main PCB 810, and the main PCB 810 may be configured for controlling the driving of a solenoid 920. Accordingly, the joystick lever module 300 may be restrained by a solenoid 920 in the pop-up position (FIGS. 1 and 7) or folding position (FIGS. 2 and 8).

Furthermore, signals of the driving mode switching unit 10 may be transmitted to the motor controller 820 through the main PCB 810, and the motor controller 820 may be configured for controlling the driving of the acceleration and deceleration motor 410. The acceleration and deceleration motor 410 may shift the joystick lever module 300 from a pop-up position to a folding position and may also provide a reaction force to the joystick lever module 300.

When a signal of the driving mode switching unit 10 is transmitted to the motor controller 820 through the main PCB 810 and the acceleration and deceleration motor 410 is operated by the control of the motor controller 820, the power of the acceleration and deceleration motor 410 is transmitted to the joystick lever module 300 through the first wire 440 and the first driven pulley 430, and the joystick lever module 300 shifts to a pop-up position or a folding position.

The joystick lever module 300 may be restrained by the solenoid 920 operated by the control of the main PCB 810 in the pop-up position or folding position.

As shown in FIG. 16, signals of the first PCB 530 are transmitted to the motor controller 820, and the motor controller 820 may be configured for controlling the driving of the acceleration and deceleration motor 410.

Furthermore, signals of the first PCB 530 are transmitted to the main PCB 810 through the motor controller 820, and the main PCB 810 may be configured for controlling the driving of the solenoid 920.

Figure 7:
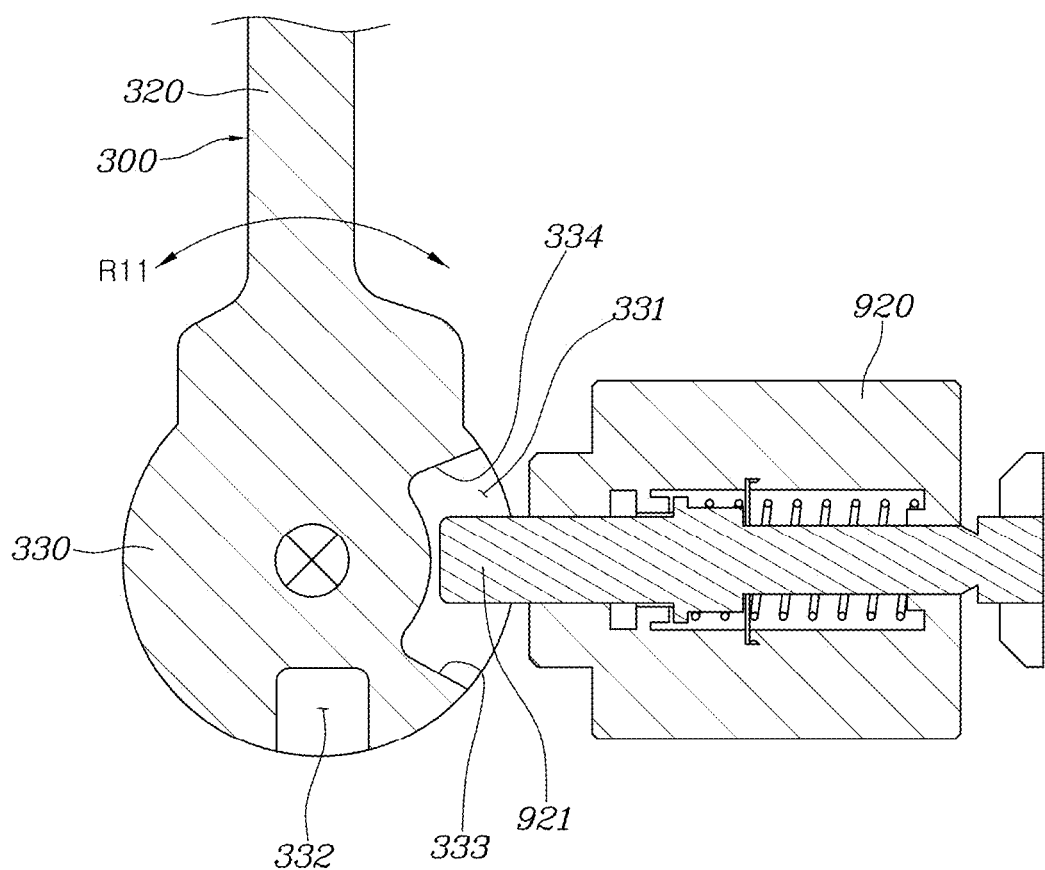
FIG. 7 and FIG. 8 are views showing a joystick lever restrained by a solenoid in a pop-up state and a folding state.
Figure 8:
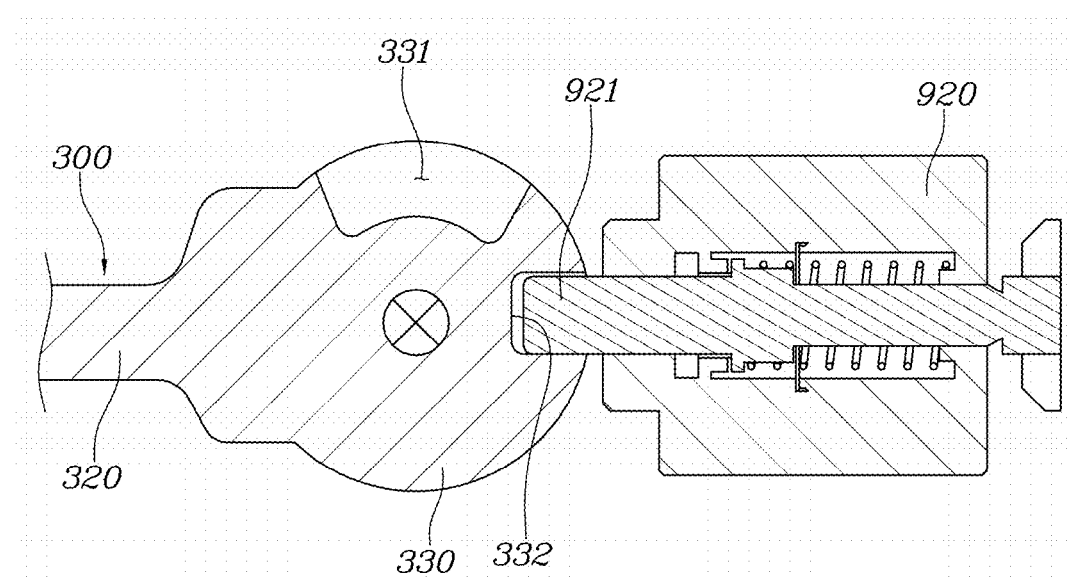
Figure 9:
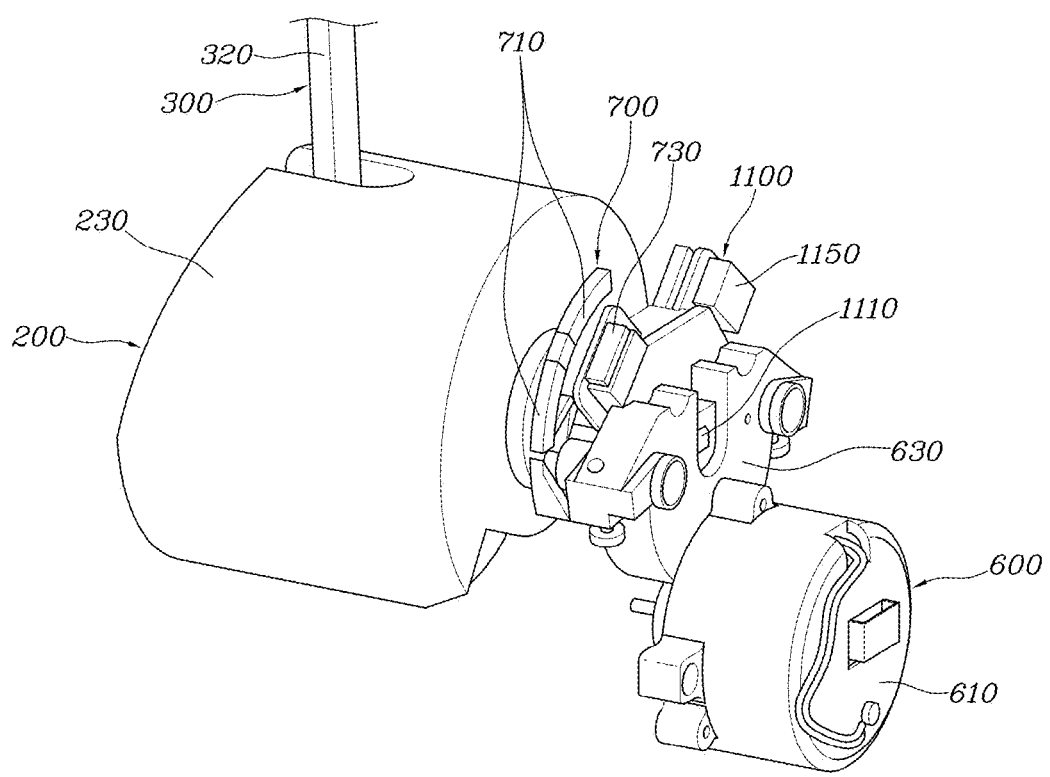
FIG. 9, FIG. 10, FIG. 11, FIG. 12, FIG. 13, FIG. 14 and FIG. 15 are views showing a steering actuator module and a torque sensor module according to an exemplary embodiment of the present disclosure.
Figure 10:
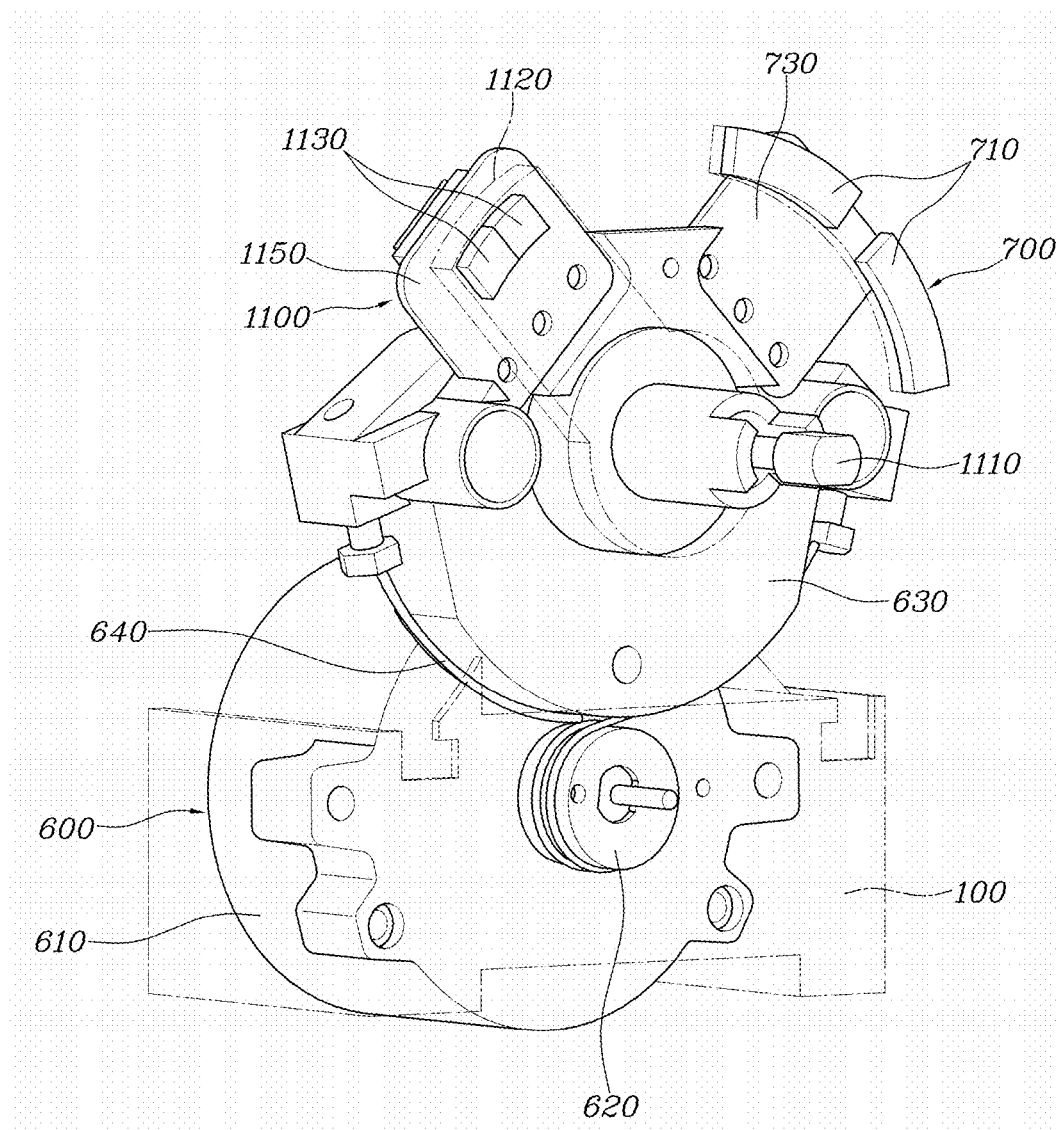
Figure 11:
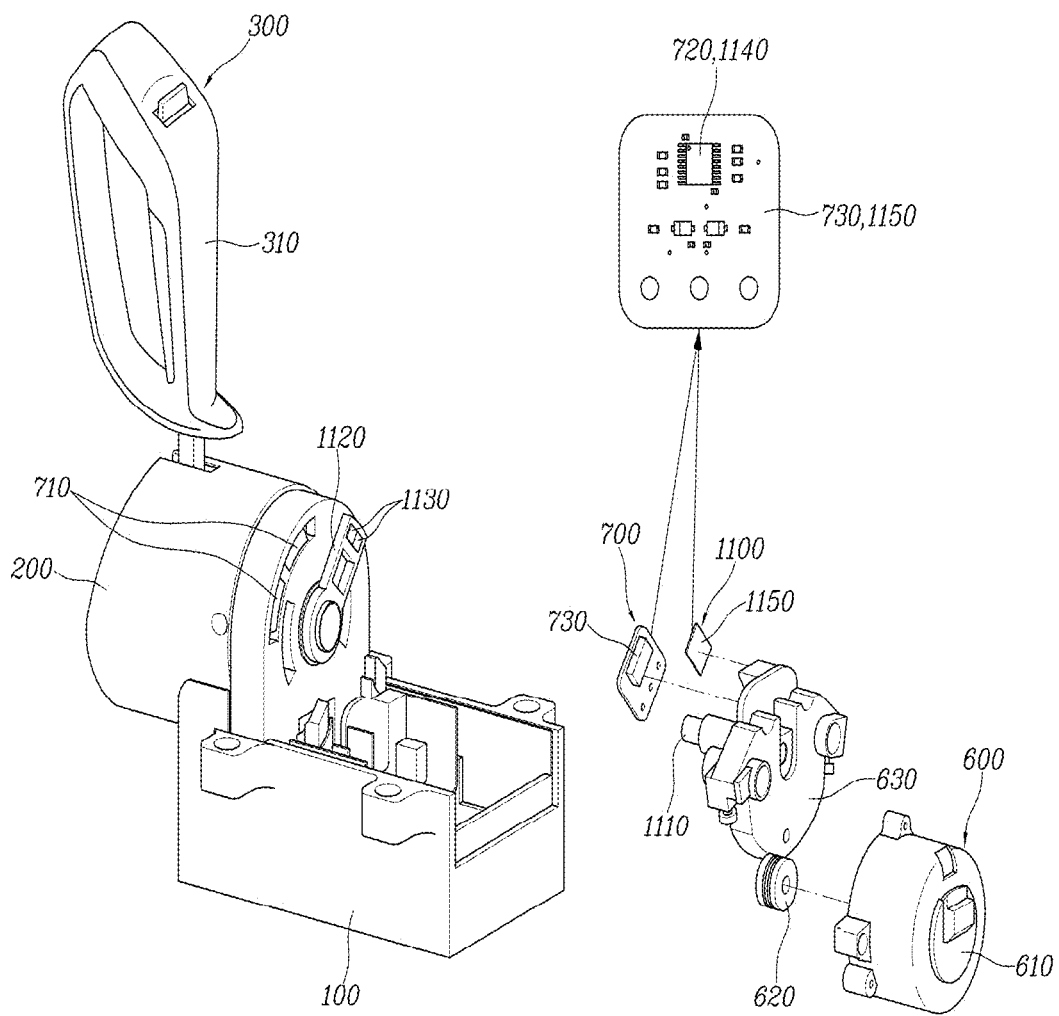

As shown in FIGS. 7 and 8, according to an exemplary embodiment of the present disclosure, a first insertion portion 331 and a second insertion portion 332 into which a plunger 921 of the solenoid 920 is selectively inserted are provided at a distance in the circumferential direction of the lever body 330 forming a lower portion of the joystick lever module 300.

The first insertion portion 331 and the second insertion portion 332 may be formed in a shape of a recessed groove in the lever body 330.

When the plunger 921 is inserted into one of the first insertion portion 331 and the second insertion portion 332, the joystick lever module 300 is in a pop-up state, and when the plunger 921 is inserted into the other insertion portion of the first insertion portion 331 and the second insertion portion 332, the joystick lever module 300 is restrained in a folding state.

According to an exemplary embodiment of the present disclosure, the first insertion portion 331 is formed longer than the second insertion portion 332 in the circumferential direction of the lever body 330.

Accordingly, when the plunger 921 is inserted into the long first insertion portion 331 as shown in FIG. 7, the joystick lever module 300 is in the pop-up state, and when the plunger 921 is inserted into the short second insertion portion 332 as shown in FIG. 8, the joystick lever module 300 is restrained in the folding state.

When the current to the solenoid 920 is cut off, the plunger 921 protrudes by the spring force of a spring 925 to be inserted into the first insertion portion 331 or the second insertion portion 332 and the joystick lever module 300 is restrained in the pop-up state or the folding state.

When the current is applied to the solenoid 920 by the control of the main PCB 810, the plunger 921 overcomes the spring force to retract and be inserted into the solenoid 920. At the instant time, the plunger 921 pulls out of the first insertion portion 331 or the second insertion portion 332 and the joystick lever module 300 is released from the restraint of the solenoid 920 and may shift from the pop-up state to the folding state or from the folding state to the pop-up state.

When the user's operation force is not applied to the joystick lever module 300 while the joystick lever module 300 is in the pop-up state as shown in FIG. 7, the plunger 921 is positioned in the middle portion of the first insertion portion 331 and the joystick lever module 300 is in the neutral position.

When the user operates the joystick lever module 300 while the plunger 921 is inserted into the first insertion portion 331 and the joystick lever module 300 is in the pop-up state, the joystick lever module 300 rotates forward or backward (arrow R11) until the plunger 921 comes into contact with one surface 333 or the other surface 334 of the first insertion portion 331. At the instant time, the first position sensor module 500 detects the rotation of the joystick lever module 300 through a magnetic flux change and transmits the detected rotation to the motor controller 820 through the main PCB 810, and the main PCB 810 generates a signal related to the acceleration or deceleration of the vehicle and transmit the signal to the vehicle controller 910.

Furthermore, the main PCB 810 generates a rotational torque signal of the acceleration and deceleration motor 410 for each position of the joystick lever module 300 and transmits the signal to the motor controller 820, the acceleration and deceleration motor 410 is driven by the control of the motor controller 820, and the power of the acceleration and deceleration motor 410 is transmitted to the joystick lever module 300 through the first drive pulley 420, the first wire 440, and the first driven pulley 430 so that a reaction force (operation force) against the acceleration or deceleration operation is generated in the joystick lever module 300. The driver can recognize the reaction force at the instant time.

Furthermore, when the user's operation force is removed from the joystick lever module 300 rotated forward or backward, the joystick lever module 300 may return to the neutral position by the reaction force generated by the first driven pulley 430.

According to an exemplary embodiment of the present disclosure, a main body cover 110 is coupled to the upper side of the main body 100, and the steering actuator module 600 and the motor controller 820 are covered and protected by the main body cover 110.

Furthermore, a lower cover 120 is coupled to the lower side of the main body 100, and the main PCB 810 is covered and protected by the lower cover 120.

According to an exemplary embodiment of the present disclosure, the steering actuator module 600 is provided in the main body 100 and connected to the acceleration and deceleration actuator housing 200.

That is, the steering actuator module 600 includes a steering motor 610 fixed to the main body 100, a second drive pulley 620 coupled to the steering motor 610 to rotate together, a second driven pulley 630 connected to the acceleration and deceleration actuator housing 200 to rotate together, and a second wire 640 connecting the second drive pulley 620 and the second driven pulley 630 to transmit power.

The steering motor 610 is fixed to one side of the acceleration and deceleration actuator housing 200 in the main body 100, and the second driven pulley 630 is connected to the acceleration and deceleration actuator housing 200 to rotate in the same direction as the acceleration and deceleration actuator housing 200 rotating during steering operation of the joystick lever module 300.

The second wire 640 of the steering actuator module 600 connects the second drive pulley 610 and the second driven pulley 630 to transmit power.

A second anti-slip pin 660 is provided on the line of the second wire 640 to prevent interference between the second drive pulley 610 and the wire 640 and fixed to the external perimeter of the second drive pulley 610.

Furthermore, second adjust bolts 670 are provided at either end portion of the second wire 640 and the second adjust bolt 670 is fixedly coupled to the second driven pulley 630. As the tension may be adjusted through the second adjust bolt 480, the second wire 640 may always maintain the constant tension.

If the user operates steering by rotating the joystick lever 310 right or left and then the controlling force is released while the steering operation is in place, the joystick lever 310 returns to the pre-rotation neutral position.

Figure 12:
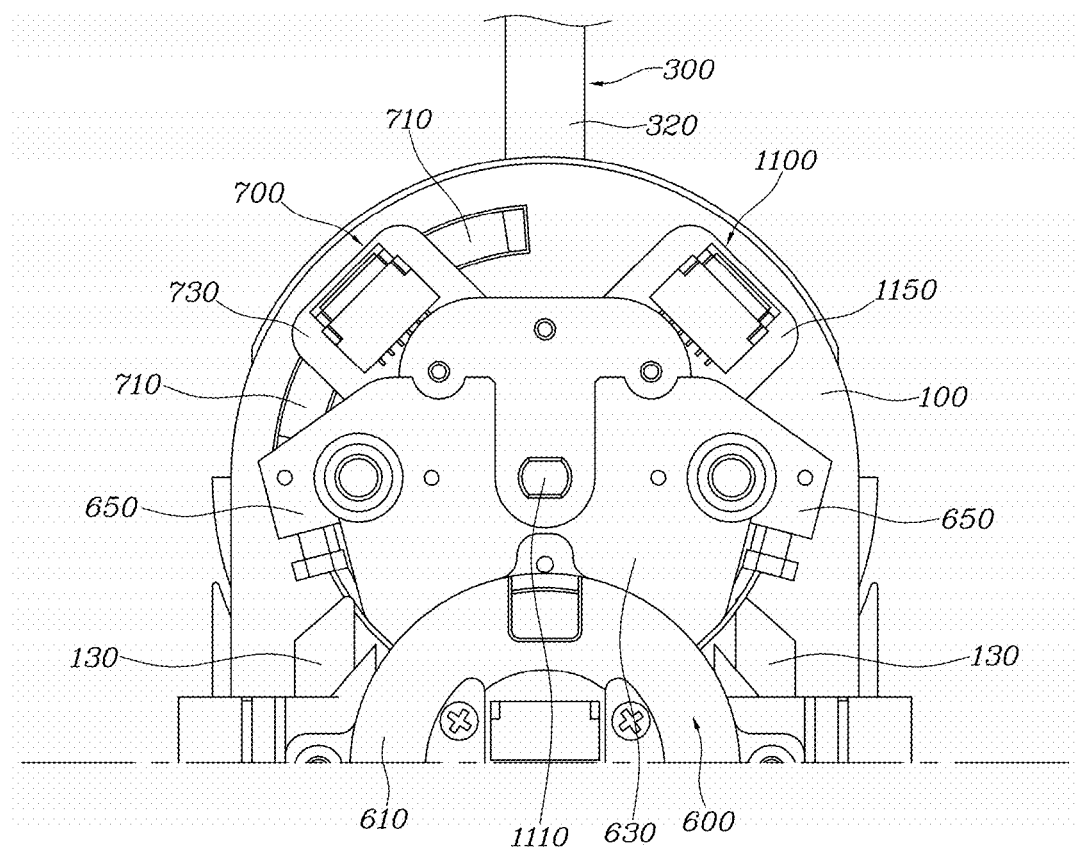
Figure 13:
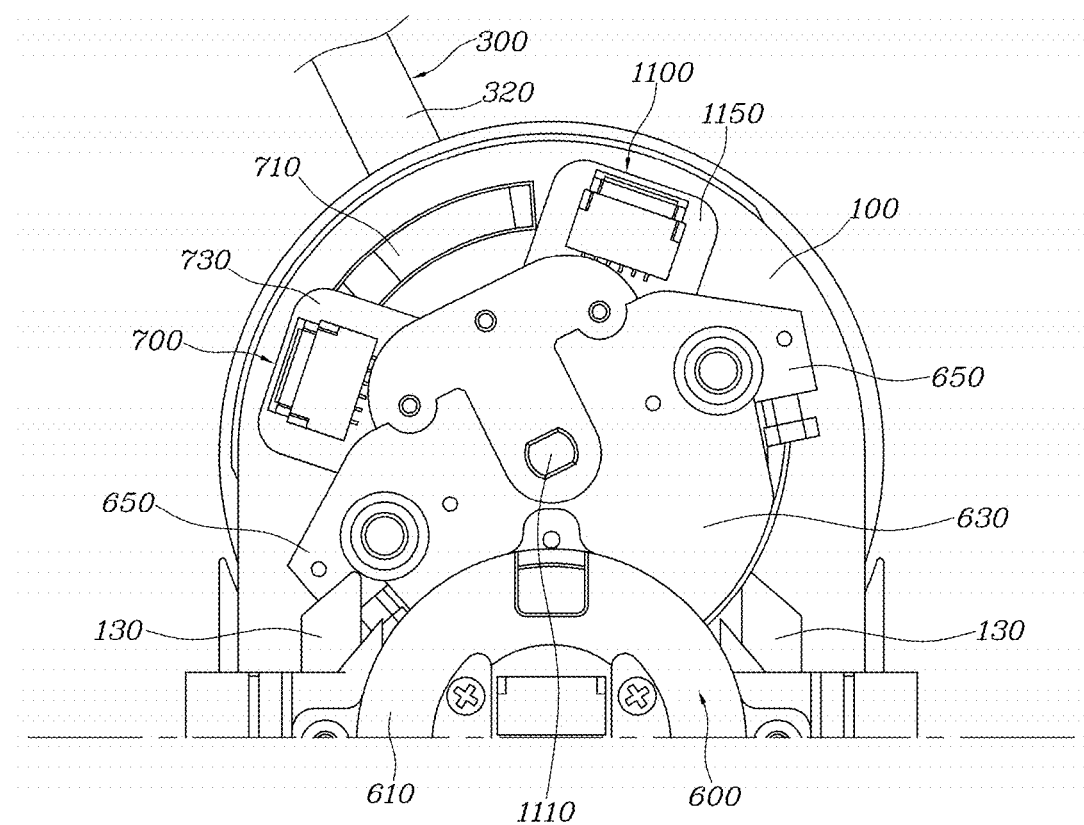
Figure 14:
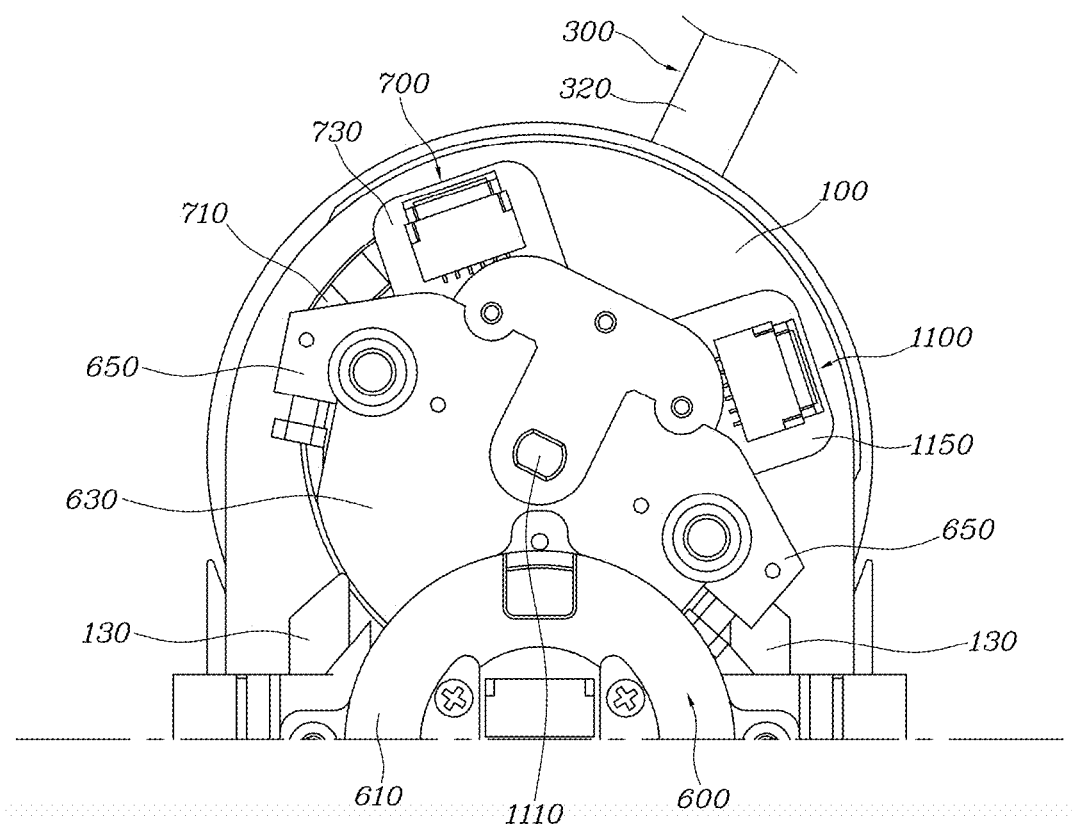
Figure 15:
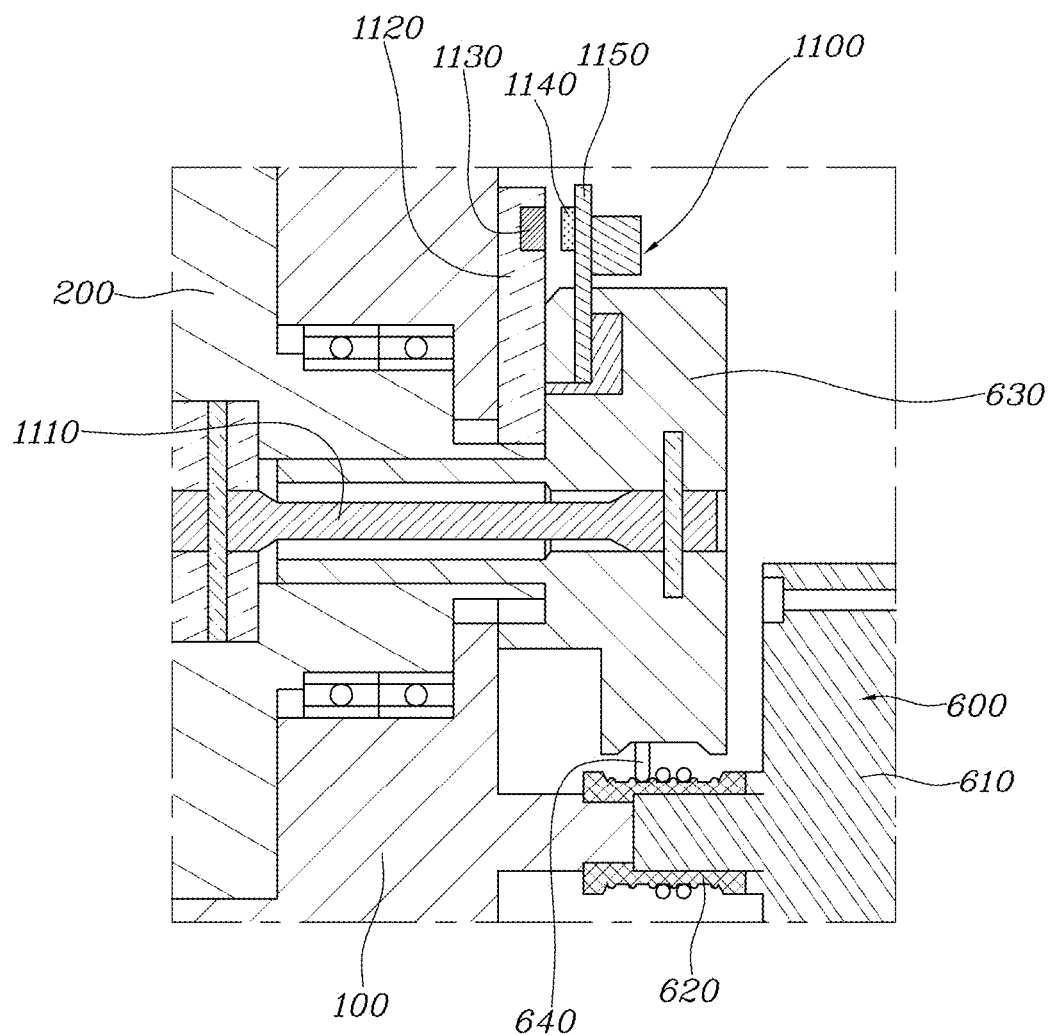

The joystick lever 310 is in the neutral position in FIG. 12, while the joystick lever 310 is rotated right or left to operate steering in FIGS. 13 and 14.

The acceleration and deceleration actuator module 400, the acceleration and deceleration actuator housing 200, and the second driven pulley 630 of the steering actuator module 600 all rotate together during steering operation of the joystick lever 310, and the maximum rotation angle of the steering may be controlled by the contact between the body stopper portion 130 provided in the main body 100 and a pulley stopper portion 650 provided in the second driven pulley 630.

That is, two body stopper portions 130 and two pulley stopper portions 650 are provided.

Each of the pulley stopper portions 650 is provided at right and left symmetrical positions with respect to the rotation center portion of the second driven pulley 630, and the body stopper portions 130 are provided at a distance below the pulley stopper portions 650 to match the pulley stopper portions 650.

Accordingly, when the pulley stopper portion 650 of the second driven pulley 630 rotating during steering operation comes into contact with the body stopper portion 130, the maximum steering rotation angle is restrained.

According to an exemplary embodiment of the present disclosure, the second position sensor module 700 includes a second permanent magnet 710 fixed to the main body 100 and a second PCB 730 coupled to the second driven pulley 630 and provided with a second Hall sensor 720 facing the second permanent magnet 710 to detect the steering position of the joystick lever module 300 through a magnetic flux change of the second permanent magnet 710 when the acceleration and deceleration actuator housing 200 and the second driven pulley 630 are rotated according to the steering operation.

When the joystick lever module 300 in the pop-up state is rotated right and left to operate steering by the user's operation, the second permanent magnet 710 is fixed in the main body 100, and instead the second PCB 730 provided with a second Hall sensor 720 is rotated by the rotation of the second driven pulley 630. At the instant time, the second PCB 730 detects the magnetic flux change caused by a position change of the second permanent magnet 710 to detect the steering position of the joystick lever module 300.

According to an exemplary embodiment of the present disclosure, the control module 800 includes the main PCB 810 and the motor controller 820 fixed to the main body 100, and the main PCB 810 and the motor controller 820 may transmit and receive signals therebetween.

As shown in FIG. 16, the signals of the second PCB 730 are transmitted to the motor controller 820, and the motor controller 820 may be configured for controlling the driving of the steering motor 610.

Furthermore, the signals of the second PCB 730 are transmitted to the main PCB 810 through the motor controller 820, and the main PCB 810 may transmit signals related to steering to the vehicle controller 910.

The second position sensor module 700 detects the rotation of the joystick lever module 300 through a magnetic flux change during steering operation of the joystick lever module 300 and transmits the detected rotation to the main PCB 810 through the motor controller 820, and the main PCB 810 generates a signal related to the steering of the vehicle and transmits the signal to the vehicle controller 910.

Furthermore, the main PCB 810 generates a rotation torque signal of the steering motor 610 for each position of the joystick lever module 300 and transmits the signal to the motor controller 820, the steering motor 610 is driven by the control of the motor controller 820, and the power of the steering motor 610 is transmitted to the joystick lever module 300 through the second drive pulley 620, the second wire 640, and the second driven pulley 630 so that the reaction force (operation force) with respect to the steering operation is generated in the joystick lever module 300. At the instant time, the driver can recognize the reaction force.

Furthermore, when the user's operation force is removed from the joystick lever module 300 rotated right and late during steering operation, the joystick lever module 300 may return to the neutral position by the reaction force generated by the second driven pulley 630.

According to an exemplary embodiment of the present disclosure, the integrated operation apparatus 1 further includes a torque sensor module 1100 provided in the acceleration and deceleration actuator housing 200 and the second driven pulley 630 to detect the magnetic field change generated by the rotational difference between the acceleration and deceleration actuator housing 200 and the second driven pulley 630 according to steering operation and utilized to feedback control the driving of the steering motor 610 by a difference value between the actual steering operation force and the target steering operation force based on the detected magnetic field.

According to an exemplary embodiment of the present disclosure, the torque sensor module 1100 includes a torsion bar 1110 connecting the acceleration and deceleration actuator housing 200 and the second driven pulley 630 and twisted due to the rotational difference between the acceleration and deceleration actuator housing 200 and the second driven pulley 630 according to steering operation, a housing bracket 1120 coupled to the acceleration and deceleration actuator housing 200 from the outside of the torsion bar 1110 to rotate together with the acceleration and deceleration actuator housing 200, a third permanent magnet 1130 coupled to the housing bracket 1120, a third Hall sensor 1140 coupled to the second driven pulley 630 to face the third permanent magnet 1130, and a third PCB 1150 detecting a magnetic field change generated by a rotational difference between the acceleration and deceleration actuator housing 200 and the second driven pulley 630 during steering operation.

The two end portions of the torsion bar 1110 are respectively coupled to the acceleration and deceleration actuator housing 200 and the second driven pulley 630 so that the acceleration and deceleration actuator housing 200 and the second driven pulley 630 are connected by the torsion bar 1110.

According to an exemplary embodiment of the present disclosure, the control module 800 includes the main PCB 810 and the motor controller 820 fixed to the main body 100, and the main PCB 810 and the motor controller 820 may transmit and receive signals therebetween.

The third PCB 1150 detects a magnetic field change generated by a rotational difference between the acceleration and deceleration actuator housing 200 and the second driven pulley 630 during steering operation and transmits the detected magnetic field change to the main PCB 810 through the motor controller 820, the main PCB 810 obtains the difference between the actual steering operation force and the target steering operation force after converting the magnetic field change into a torque value and then transmits the signal to the motor controller 820, and the motor controller 820 feedback is configured to control the driving of the steering motor 610 by the difference value at the signals of the main PCB 810.

That is, the torque sensor module 1100 is provided only in the steering actuator module 600, and the values measured by the torque sensor module 1100 are utilized to feedback control the steering motor 610 so that precise steering sensation (target operation force) may be realized.

The torque sensor module 1100 directly measures the control force that the driver feels using the joystick lever module 300 during steering operation, the difference from the target steering operation force according to the driving state of the vehicle is obtained, and the steering motor 610 is feedback-controlled based on the obtained difference value, including the advantage of realizing more precise steering sensation.

As described above, in the integrated operation apparatus for a vehicle according to an exemplary embodiment of the present disclosure, a joystick lever 310 may be used to accelerate, decelerate, and steer the vehicle, including the advantage of improving marketability through easy operation and user satisfaction.

Furthermore, in the integrated operation apparatus according to an exemplary embodiment of the present disclosure, the acceleration and deceleration actuator module 400 and the steering actuator module 600 are respectively provided with position sensor modules 500, 700 to detect the position of the joystick lever module 300 during the acceleration or deceleration operation and steering operation and transmit signals related to the acceleration or deceleration and steering of the vehicle to the vehicle controller 910, and in the case of the acceleration and deceleration actuator module 400, there is the advantage that the acceleration and deceleration motor 410 generates torque so that the driver can feel the proper operation force according to the position of the joystick lever module 300.

Furthermore, the steering actuator module 600 is additionally provided with the torque sensor module 1100 directly measuring the control force felt by the driver using the joystick lever module 300 during steering operation, obtains the difference from the target steering operation force according to the driving state of the vehicle, and feedback is configured to control the steering motor 610 based on the obtained difference, including the advantage of realizing more precise steering sensation.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An integrated operation apparatus for a vehicle, the apparatus comprising:
    a joystick lever module coupled to an acceleration and deceleration actuator housing coupled to a main body rotatably in right and left directions and activated in response to a user's operation to accelerate, decelerate, and steer the vehicle;
    an acceleration and deceleration actuator module coupled to the acceleration and deceleration actuator housing and connected to the joystick lever module for power transmission to generate a reaction force in the joystick lever module rotated for accelerating or decelerating during operation thereof and return the joystick lever module to a neutral position with the generated reaction force;
    a first position sensor module provided in the joystick lever module and the acceleration and deceleration actuator housing to detect acceleration and deceleration positions of the joystick lever module;
    a steering actuator module coupled to the main body and connected to the acceleration and deceleration actuator housing to generate a reaction force in the joystick lever module rotated for steering during operation thereof and return the joystick lever module to the neutral position with the generated reaction force;
    a second position sensor module provided in the main body and the steering actuator module to detect a steering position of the joystick lever module; and
    a control module generating the vehicle's acceleration, deceleration, and steering signals according to a signal received from the first and second position sensor modules and controlling the acceleration and deceleration actuator module and the steering actuator module, wherein the first position sensor module is further configured for detecting folding and pop-up positions of the joystick lever module.

2. The apparatus of claim 1, wherein the joystick lever module is rotated forward or backward to operate the acceleration or the deceleration of the vehicle, and wherein the acceleration and deceleration actuator housing remains fixed to the main body and only the joystick lever module rotates with respect to the acceleration and deceleration actuator housing during acceleration operation or deceleration operation of the joystick lever module.

3. The apparatus of claim 1, wherein the joystick lever module is rotated right and left to operate the steering, and wherein the acceleration and deceleration actuator module, the acceleration and deceleration actuator housing, and a portion of the steering actuator module rotate with respect to the main body during steering operation of the joystick lever module.

4. The apparatus of claim 1, wherein the joystick lever module includes:

a joystick lever configured to be grabbed by the user; and a lever body including a rod connected to the joystick lever and connected to the acceleration and deceleration actuator module.

5. An integrated operation apparatus for a vehicle, the apparatus comprising:

a joystick lever module coupled to an acceleration and deceleration actuator housing coupled to a main body rotatably in right and left directions and activated in response to a user's operation to accelerate, decelerate, and steer the vehicle;

an acceleration and deceleration actuator module coupled to the acceleration and deceleration actuator housing and connected to the joystick lever module for power transmission to generate a reaction force in the joystick lever module rotated for accelerating or decelerating during operation thereof and return the joystick lever module to a neutral position with the generated reaction force;

a first position sensor module provided in the joystick lever module and the acceleration and deceleration actuator housing to detect acceleration and deceleration positions of the joystick lever module;

a steering actuator module coupled to the main body and connected to the acceleration and deceleration actuator housing to generate a reaction force in the joystick lever module rotated for steering during operation thereof and return the joystick lever module to the neutral position with the generated reaction force;

a second position sensor module provided in the main body and the steering actuator module to detect a steering position of the joystick lever module; and a control module generating the vehicle's acceleration, deceleration, and steering signals according to a signal received from the first and second position sensor modules and controlling the acceleration and deceleration actuator module and the steering actuator module, wherein the joystick lever module includes:

a joystick lever configured to be grabbed by the user; and a lever body including a rod connected to the joystick lever and connected to the acceleration and deceleration actuator module, and wherein the acceleration and deceleration actuator module includes:

an acceleration and deceleration motor fixed to the acceleration and deceleration actuator housing;

a first drive pulley coupled to the acceleration and deceleration motor to rotate together;

a first driven pulley integrally coupled to the lever body forming a lower portion of the joystick lever module; and a first wire engaging the first drive pulley and the first driven pulley to transmit power from the first drive pulley to the first driven pulley.

6. The apparatus of claim 5, wherein the first position sensor module includes:

a first permanent magnet fixedly coupled to the lever body forming the lower portion of the joystick lever module; and a first printed circuit board (PCB) fixed to the acceleration and deceleration actuator housing and provided with a first Hall sensor facing the first permanent magnet to detect the acceleration and deceleration positions of the joystick lever module through a magnetic flux change caused by a position change of the first permanent magnet when the lever body rotates.

7. The apparatus of claim 6, wherein the control module includes a main PCB and a motor controller fixed to the main body, wherein the main PCB and the motor controller are configured to transmit and receive signals therebetween, and wherein the motor controller is configured to control driving of the acceleration and deceleration motor according to the signal received from the first PCB signal.

8. An integrated operation apparatus for a vehicle, the apparatus comprising:

a joystick lever module coupled to an acceleration and deceleration actuator housing coupled to a main body rotatably in right and left directions and activated in response to a user's operation to accelerate, decelerate, and steer the vehicle;

an acceleration and deceleration actuator module coupled to the acceleration and deceleration actuator housing and connected to the joystick lever module for power transmission to generate a reaction force in the joystick lever module rotated for accelerating or decelerating during operation thereof and return the joystick lever module to a neutral position with the generated reaction force;

a first position sensor module provided in the joystick lever module and the acceleration and deceleration actuator housing to detect acceleration and deceleration positions of the joystick lever module;

a steering actuator module coupled to the main body and connected to the acceleration and deceleration actuator housing to generate a reaction force in the joystick lever module rotated for steering during operation thereof and return the joystick lever module to the neutral position with the generated reaction force;

a second position sensor module provided in the main body and the steering actuator module to detect a steering position of the joystick lever module; and a control module generating the vehicle's acceleration, deceleration, and steering signals according to a signal received from the first and second position sensor modules and controlling the acceleration and deceleration actuator module and the steering actuator module, wherein the steering actuator module includes:
- a steering motor fixed to the main body;
- a second drive pulley coupled to the steering motor to rotate together;
- a second driven pulley coupled to the acceleration and deceleration actuator housing to rotate together; and
- a second wire engaging the second drive pulley and the second driven pulley to transmit power from the second drive pulley to the second driven pulley.

9. The apparatus of claim 8, further including a body stopper portion provided in the main body and a pulley stopper portion provided in the second driven pulley, wherein a maximum steering angle is restrained in response that the pulley stopper portion comes into contact with the body stopper portion during the rotation of the second driven pulley according to steering operation.

10. The apparatus of claim 9, wherein the pulley stopper portion is symmetrically provided right and left with respect to a rotation center portion of the second driven pulley, and wherein the body stopper portion is provided at a distance below the pulley stopper portion to match the pulley stopper portion.

11. The apparatus of claim 8, wherein the second position sensor module includes:
- a second permanent magnet fixed to the main body; and
- a second PCB coupled to the second driven pulley and provided with a second Hall sensor facing the second permanent magnet to detect the steering position of the joystick lever module through a magnetic flux change of the second permanent magnet during the rotation of the acceleration and deceleration actuator housing and the second driven pulley according to the steering operation.

12. The apparatus of claim 11, wherein the control module includes a main PCB and a motor controller fixed to the main body, wherein the main PCB and the motor controller are configured to transmit and receive signals therebetween, and wherein the motor controller is configured to control driving of the steering motor according to the signal received from the second PCB signal.

13. The apparatus of claim 9, further including a torque sensor module provided in the acceleration and deceleration actuator housing and the second driven pulley to detect a magnetic field change generated by a rotational difference between the acceleration and deceleration actuator housing and the second driven pulley during steering operation and utilized to feedback control driving of the steering motor by a difference value between an actual steering operation force and a target steering operation force based on the detected magnetic field change.

14. The apparatus of claim 13, wherein the torque sensor module includes:
- a torsion bar connecting the acceleration and deceleration actuator housing and the second driven pulley and twisted by a rotational difference between the acceleration and deceleration actuator housing and the second driven pulley according to the steering operation;
- a housing bracket coupled to the acceleration and deceleration actuator housing from outside of the torsion bar to rotate together with the acceleration and deceleration actuator housing;
- a third permanent magnet coupled to the housing bracket; and
- a third PCB coupled to the second driven pulley and provided with a third Hall sensor facing the third permanent magnet to detect a magnetic field change generated by the rotational difference between the acceleration and deceleration actuator housing and the second driven pulley during the steering operation.

15. The apparatus of claim 14, wherein the control module includes a main PCB and a motor controller fixed to the main body, wherein the main PCB and the motor controller are configured to transmit and receive signals therebetween, wherein the third PCB detects a magnetic field change generated by the rotational difference between the acceleration and deceleration actuator housing and the second driven pulley during the steering operation and transmits the magnetic field change to the main PCB, wherein the main PCB obtains the difference between the actual steering operation force and the target steering operation force after converting the magnetic field change into a torque value and then transmits a signal to the motor controller, and wherein the motor controller feedback is configured to control the driving of the steering motor by the difference value at the signal received from the main PCB.

16. The apparatus of claim 5, wherein the power of the acceleration and deceleration motor is transmitted to the joystick lever module through the first drive pulley, the first wire, and the first driven pulley so that the joystick lever module shifts to a pop-up position or a folding position.

17. The apparatus of claim 1, wherein the joystick lever module is restrained by a solenoid in the pop-up position or folding position.

18. The apparatus of claim 5, wherein a first anti-slip pin is provided on a line of the first wire and fixed to an external periphery of the first drive pulley, and wherein first adjust bolts are provided at end portions of the first wire and fixedly coupled to the first driven pulley.

19. The apparatus of claim 8, wherein a second anti-slip pin is provided on a line of the second wire and fixed to an external periphery of the second drive pulley, and wherein second adjust bolts are provided at end portions of the second wire and fixedly coupled to the second driven pulley.

* * * * *